(12) United States Patent
Goplen et al.

(10) Patent No.: US 8,181,453 B2
(45) Date of Patent: May 22, 2012

(54) EXHAUST VENTURI APPARATUS, SYSTEM, AND METHOD

(75) Inventors: Gary D. Goplen, Stoughton, WI (US); Thomas M. Asplund, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 1233 days.

(21) Appl. No.: 11/421,644

(22) Filed: Jun. 1, 2006

(65) Prior Publication Data
US 2011/0047997 A1    Mar. 3, 2011

(51) Int. Cl.
*F01N 5/04*    (2006.01)
(52) U.S. Cl. ............................ 60/319; 60/317
(58) Field of Classification Search .............. 60/317, 60/319, 324, 289; 137/888
See application file for complete search history.

(56) References Cited

U.S. PATENT DOCUMENTS

| | | | | |
|---|---|---|---|---|
| 3,032,969 A | * | 5/1962 | Barnes | 60/276 |
| 3,520,131 A | * | 7/1970 | Briggs | 60/308 |
| 3,543,510 A | * | 12/1970 | Kaufmann, Jr. | 60/308 |
| 3,630,031 A | * | 12/1971 | Grainger | 60/305 |
| 4,209,493 A | | 6/1980 | Olson | 422/176 |
| 4,249,164 A | * | 2/1981 | Tivy | 340/870.3 |
| 5,339,629 A | | 8/1994 | Winberg et al. | 60/299 |
| 5,515,674 A | | 5/1996 | Kaufmann, Jr. | |
| 5,590,523 A | * | 1/1997 | Fox | 60/307 |
| 5,746,242 A | * | 5/1998 | Frederick | 137/177 |
| 5,768,890 A | * | 6/1998 | Bekkering et al. | 60/305 |
| 2003/0111065 A1 | | 6/2003 | Blum | |
| 2005/0161283 A1 | | 7/2005 | Emler | 181/249 |
| 2005/0217929 A1 | | 10/2005 | Kicinski | 181/249 |
| 2005/0217931 A1 | | 10/2005 | Assad | 181/258 |

OTHER PUBLICATIONS

CN200710106538.0 Office Action, Aug. 18, 2010.

* cited by examiner

*Primary Examiner* — Thomas Denion
*Assistant Examiner* — Jonathan Matthias
(74) *Attorney, Agent, or Firm* — Kunzler Needham Massey & Thorpe (57) ABSTRACT

An exhaust Venturi apparatus, system, and method includes an elongate housing for passage of exhaust gases, a Venturi mechanism disposed on the housing, the Venturi mechanism configured to create a low-pressure zone in the exhaust gases within the housing, and an aperture disposed in a side of the housing downstream of the Venturi mechanism, such that secondary air outside the housing is drawn into the exhaust stream. The aperture may comprise one or a plurality of apertures, small in cross-section compared to the housing cross-section, for minimizing sound emanating from the exhaust system. The Venturi mechanism may comprise a Venturi plate mounted between the housing and the engine.

21 Claims, 6 Drawing Sheets

EXHAUST VENTURI APPARATUS, SYSTEM, AND METHOD

BACKGROUND OF THE INVENTION

1. Field of the Invention

The present invention relates to engine exhaust systems, and more particularly to exhaust treatment systems that may benefit from the introduction of secondary air.

2. Description of the Related Art

Increasingly strict exhaust emission regulations are requiring better catalysts for use in acoustic mufflers or other exhaust system components, and better performance from existing catalysts. Such catalytic devices often perform significantly better if the gases introduced therein are not solely exhaust gases, but a mixture of exhaust gases and secondary air (generally atmospheric air), allowing the process of catalytic conversion, which may include reduction of nitrogen oxides, oxidation of hydrocarbons, and carbon monoxide, to proceed more efficiently through the chemistry of the gaseous components, as is known.

Existing devices introduce secondary air into the exhaust stream in various ways, using air pumps, control valves, reed valves, and other devices. Such mechanisms are often cumbersome and expensive, and may not allow for the insertion of the proper amount of secondary air. Additionally, existing devices often require the use of baffles and/or other devices to keep acoustic energy from leaving the system through the ports of communication between the secondary air source and the exhaust gases, exceeding noise regulations.

Better and more efficient introduction of secondary air into the exhaust system may result in the use of smaller catalytic devices, since the conversion process will be more efficient. Additionally, even non-catalytic exhaust treatment systems may benefit from the introduction of secondary air to reduce internal exhaust gas and component temperatures.

SUMMARY OF THE INVENTION

The present invention has been developed in response to the present state of the art, and in particular, in response to problems and needs in the art that have not yet been fully solved by currently available devices.

In one aspect of the invention, an apparatus for introducing secondary air into exhaust gases includes an elongate housing configured to contain exhaust gas flowing from a first end of the housing to a second end of the housing. The housing's cross-sectional area is substantially equal throughout the length of the housing except for a differential-pressure section of the housing that is of smaller cross-sectional area. The differential-pressure section of the housing is configured to create a low-pressure zone in the exhaust gases. An opening is disposed on a side of the housing, located such that secondary gases communicate with and flow into the low-pressure zone.

In a further aspect of the invention, an apparatus for introducing secondary air into exhaust gases includes an elongate housing for passage of exhaust gases and a Venturi plate disposed on the housing; the Venturi plate is configured to create a low-pressure zone in the exhaust gases within the housing. An aperture is disposed in a side of the housing downstream of the Venturi plate, such that secondary air outside the housing is drawn into the exhaust stream.

In one embodiment, the Venturi plate is mounted between the housing and the exhaust-producing engine, and the aperture comprises a plurality of apertures that are small relative to the housing. The apertures may comprise slots on the flange extending from the outer circumference to the inner circumference of the flange, with the Venturi plate being configured to lie flat on the flange such that the Venturi plate closes the open side of the slots.

In a further aspect of the invention, a method of introducing secondary air into exhaust gases contained within an elongate housing includes urging the exhaust gases through the housing to form an exhaust stream, creating a low-pressure zone within the exhaust stream, and allowing secondary air outside the housing to be drawn into the low-pressure zone through a plurality of small openings disposed on the housing. In one embodiment, creating the low-pressure zone within the exhaust stream includes placing a Venturi plate in the exhaust stream, and the secondary air is allowed to be drawn into the low-pressure zone immediately downstream of the Venturi plate.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
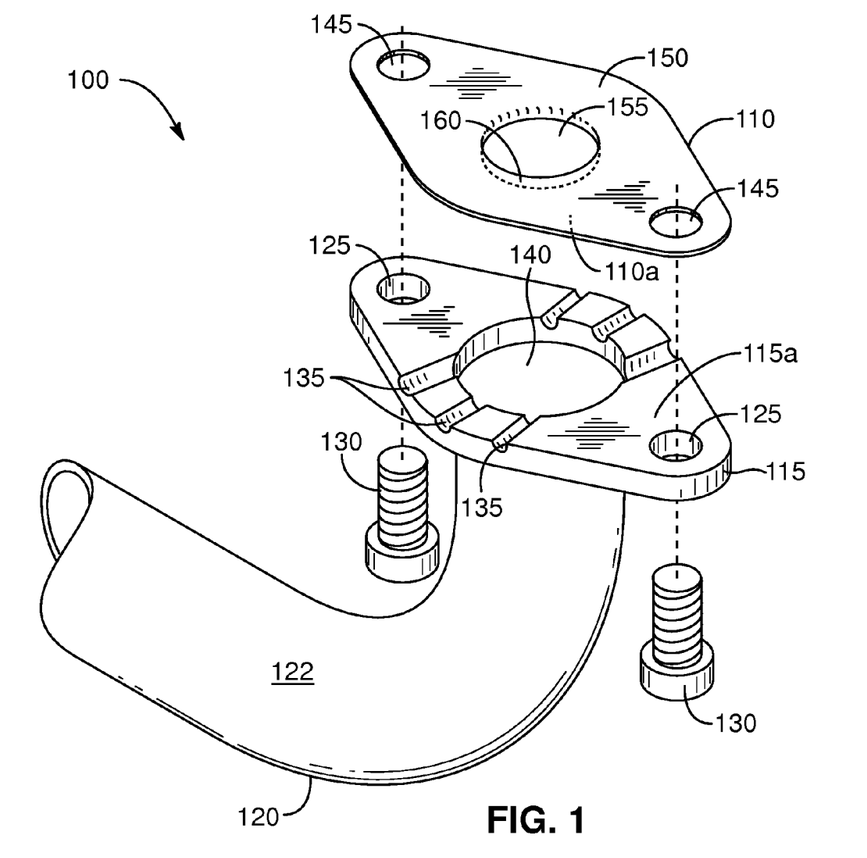
FIG. 1 is an exploded perspective view of an embodiment of an exhaust Venturi apparatus according to the present invention.

FIG. 1 shows an embodiment of an exhaust Venturi apparatus 100 according to the present invention. The apparatus 100 is generally intended for use primarily in small gasoline engine applications (such as 40 horsepower or below), though it may also be used with other engines of different sizes and types, such as diesel engines.

The apparatus 100 comprises a Venturi plate or reducing cone 110, an exhaust tube mounting flange 115, and exhaust tube 120. The exhaust tube 120 defines a passage 122 for the passage of exhaust gases. The mounting flange 115 is welded or otherwise attached to the exhaust tube 120. The mounting flange 115 is diamond shaped, with rounded corners, and contains mounting holes 125 adapted for the passage of bolts 130 or other suitable connectors to mount the mounting flange 115 to an engine. The mounting flange 115 further contains six slots or grooves 135, which run from the outer circumference of the mounting flange 115 to an inner circumference or central hole 140 in the mounting flange 115. The central hole 140 is circular in cross-section and defines, with the housing 120, the exhaust gas passage 122.

To give an idea of the size of the apparatus, though the dimensions may be changed without affecting performance, in one embodiment the exhaust tube 120 is 1.125 inches in outside diameter, with the flange 2.75 inches in length. The slots are 0.125 inches wide at their widest point.

The Venturi plate 110 is generally flat and of the same size and shape in its outer edge as the mounting flange 115. The bottom surface 110a of the Venturi plate 110 is configured to abut the flat top surface 115a of the mounting flange 115 each such that the seal between them is substantially air-tight except for the slots 135, which provide fluid communication between the atmosphere and exhaust gas passage 122. This arrangement can be seen in FIG. 2, which shows the Venturi plate 110 and mounting flange 115 in abutting engagement.

Figure 2:
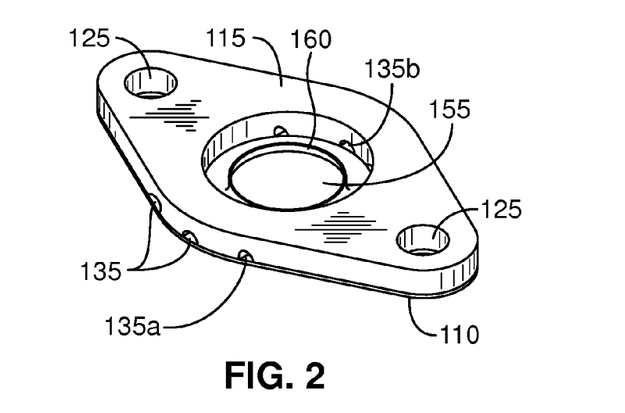
FIG. 2 is a perspective view of the exhaust Venturi apparatus of FIG. 1, with the exhaust tube being removed for clarity.

As can be seen in FIG. 2, the open sides of the slots 135 are closed when the Venturi plate 110 and mounting flange 115 are engaged, converting them into holes disposed through the engaged flange 115 and plate 110, with a first end 135a open to the atmosphere and a second end 135b open to the exhaust passage 122.

Figures 6, 7:
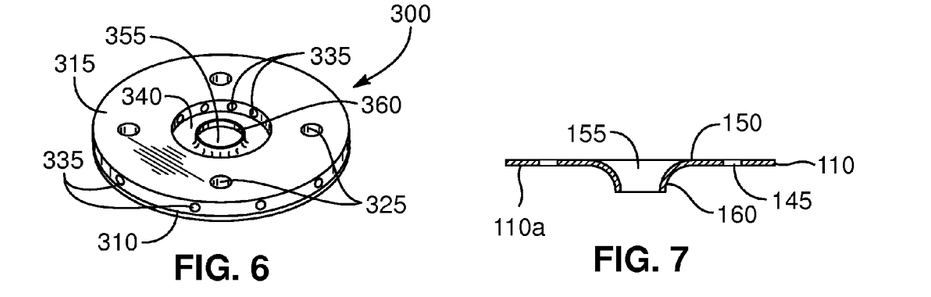
FIG. 6 is a perspective view of another embodiment of an exhaust Venturi according to the present invention.
FIG. 7 is a cross-sectional view of the Venturi plate used in the apparatus of FIG. 1.

Referring now also to FIG. 7, the Venturi plate 110 generally comprises a flat plate 150, a central hole 155, and a flare or collar 160 that extends downwardly from the edge of the central hole 155, with the intersection between the flat plate 150 and flare 160 curving smoothly to minimize exhaust flow disruption. The flare is 4 millimeters in height in one embodiment. The Venturi plate 110 contains mounting holes 145 corresponding to the flange mounting holes 125 when the two are in abutting engagement. The central hole 155, together with the flare 160, is smaller than the flange central hole 140.

Figure 3:
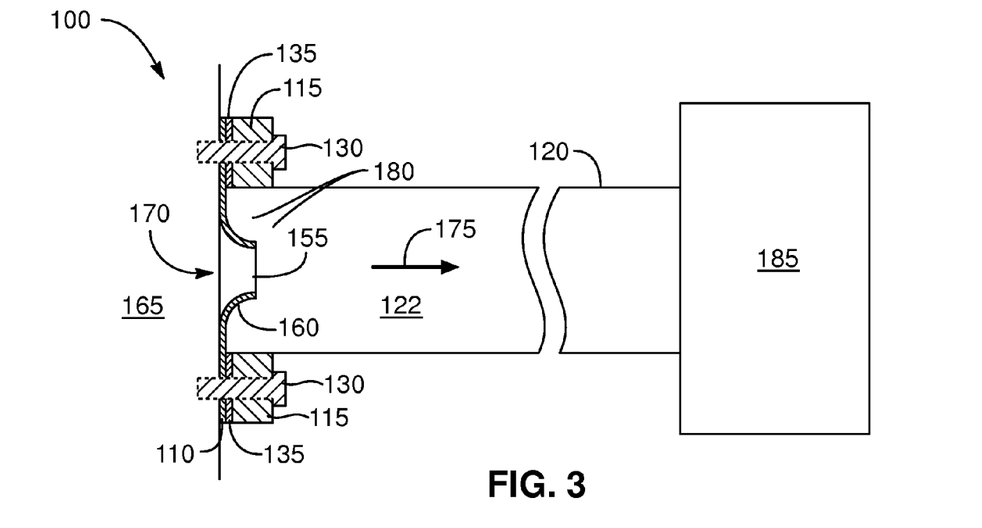
FIG. 3 is a cross-sectional view of the exhaust Venturi apparatus of FIG. 1 mounted to an engine and catalytic device.

The operation of the apparatus 100 can be seen most clearly in FIG. 3. As shown, the exhaust tube 120, which may or may not be of unitary construction with the mounting flange 115, is placed in mounting engagement against an exhaust producer, such as an engine head 165, via mounting bolts 130. The engine head 165 contains an exhaust outlet 170, in one embodiment of the same inner diameter as the exhaust passage 122. Such a mounting arrangement (absent the Venturi flange 110) is commonly used in the art, with the exhaust gases exiting the exhaust outlet 170 and flowing into and through the passage 122 in the direction of the arrow 175.

As shown in FIG. 3, however, in this embodiment of the invention the Venturi plate 110 is placed in mounting engagement between the mounting flange 115 and the engine head 165. The presence of the Venturi plate 110, with its central hole 155 and flare 160, creates a Venturi effect in the exhaust stream, forcing the exhaust through a smaller opening, increasing velocity, and creating a low pressure zone generally in the area 180 of the exhaust passage 122. The low-pressure zone 180 causes atmospheric air to be drawn into the exhaust passage 122 through the slots or holes 135. The exhaust gases mix with in the passage 122 with the atmospheric air thus drawn in as the gases proceed downstream, entering a catalytic converter 185.

It will be appreciated by those skilled in the art that while the general direction of the gases will be in the direction of the arrow 175, there will be necessarily be some turbulence occasioned by the Venturi plate 110, assisting the mixing of the gases before entering the catalytic converter 185. The device 185 may comprise a catalytic muffler, non-catalytic muffler, other device, or no device at all, allowing the gaseous mixture to enter the atmosphere directly.

The slots 135 are considered to be located downstream of the Venturi plate 110, even though part of the Venturi plate 110 (the flare 160) physically extends farther downstream than the slots 135. Generally, the exhaust gases located upstream of the flat plate portion 150 of the Venturi plate 110 are in a relatively high-pressure zone, while the exhaust gases located immediately downstream of the flat plate portion 150 are in a relatively low-pressure zone 180. The location of the slots 135 may vary within that low-pressure zone 180, though the pressure will become more equalized as the exhaust gases progress farther down the exhaust tube 120. Generally, the location of the slots 135 "downstream" of the Venturi plate in this application means a location where atmospheric gases are able to enter the low-pressure zone 180 through the slots 135.

The apparatus shown in FIG. 3 is horizontal, but may be oriented at any angle. The mounting flange 115 reflects standard construction in the art, though it may be of any shape or configuration suitable for mounting the exhaust tube 120 onto the engine head 165, or the exhaust tube 120 may be configured to mount directly onto the engine head 165 without a mounting flange, in which case the Venturi plate 110 would be configured to mount directly between the exhaust tube 120 and engine head 165. The mounting flange 115 may be considered part of the exhaust tube 120.

Figure 3A:
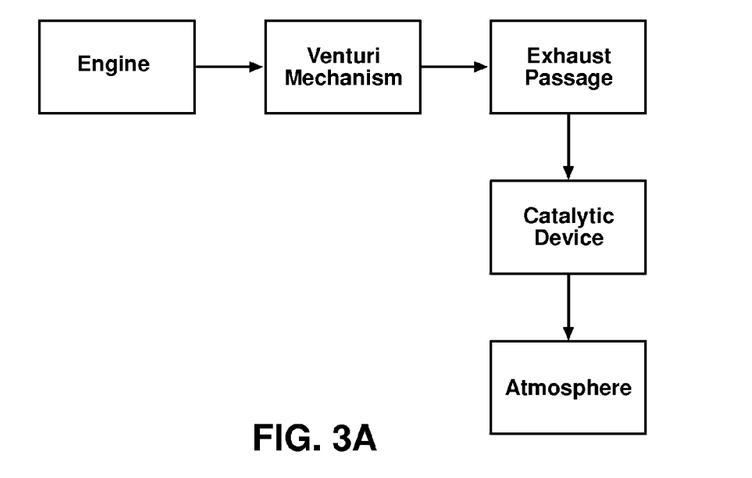
FIG. 3A is a schematic view of the apparatus of FIG. 3.

FIG. 3A schematically shows the operation described above with regard to FIG. 3. The exhaust gases leave an engine or exhaust manifold, such as an engine head 165, pass through a Venturi mechanism such as the Venturi plate 110, pass through an exhaust passage such as the passage 122 where the gases mix together, through a catalytic converter 185 and thence to atmosphere.

The slots 135 are small in diameter compared to the exhaust passage 122 in order to minimize the sound or acoustic energy leaving the system. Given their size, the slots 135 are able to accomplish their purpose of introducing secondary air into the exhaust stream while allowing only a small amount of sound to escape without the use of the baffles, plates, and other devices intervening between the exhaust passage and atmosphere that are used in existing apparatuses. The slots may be larger or smaller in diameter, depending on the application and the need to minimize sound leaving the system, and their number may vary. Generally, their total cross-sectional area should be large enough to enable sufficient secondary air to enter the exhaust stream, but small enough to minimize noise.

The embodiment shown in FIGS. 1-3 is convenient and advantageous in many respects because it requires little modification from prior art apparatuses, simply requiring the installation of the Venturi plate 110 between an exhaust pipe and engine exhaust outlet. It requires no moving parts, unlike existing air-pump secondary air systems. The design also functions as a water protection device in applications where the exhaust tube, rather than being oriented horizontally as shown in the illustrated embodiment, travels vertically toward the muffler or catalytic device. In such an embodiment, water that happens to pass through the muffler and back down the exhaust passage can be directed through the slots and away from the engine exhaust port, reducing damage to the engine.

Figure 4:
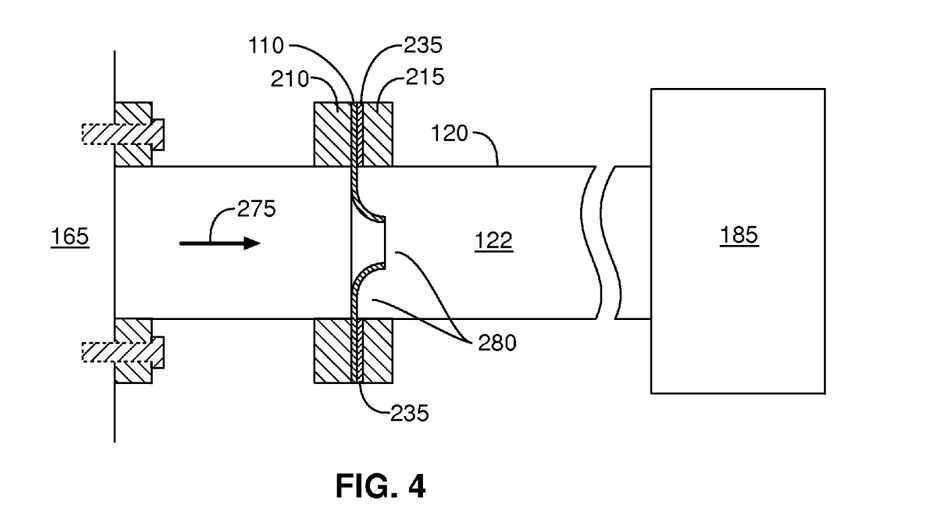
FIG. 4 is a cross-sectional view of another embodiment of an exhaust Venturi apparatus according to the present invention, with the Venturi mechanism mounted on the exhaust tube.

The Venturi plate 110 may be placed at any point along the exhaust stream, if desired, such as that illustrated in FIG. 4, where it is placed at a point along the exhaust tube 120 between the engine head 165 and the catalytic converter 185. In this embodiment, mounting flanges 210 and 215 are disposed in abutting engagement with the Venturi plate 110 for purposes of mounting the Venturi plate to the exhaust tube 120, and may be secured by any suitable means. Slots 235, of similar construction to the slots 135 shown in FIGS. 1-3, are disposed in the mounting flange 215, with the Venturi plate's engagement sealing their open side and converting them to holes whereby atmospheric gases may communicate with the exhaust gases.

The embodiment shown in FIG. 4 operates similarly to that shown in FIGS. 1-3, except that the exhaust gases pass through the exhaust passage 122 at normal pressure between the engine head 165 and Venturi plate 110, at which point they are forced through the Venturi plate 110, creating a low-pressure zone 280, with atmospheric gases being introduced into the exhaust gases through the slots 235. The gases mix together in the exhaust passage 122 while traveling generally in the direction of the arrow 275 toward the catalytic converter 185.

If desired, the Venturi plate 110 may even be placed next to the catalytic converter 185, as shown in FIG. 5, or be made integral therewith, though the exhaust and atmospheric gases may not have as much opportunity to mix in this embodiment as they have in the embodiments discussed above, since in FIG. 5 there is little or no exhaust passage remaining downstream of the Venturi plate 110.

Figure 5:
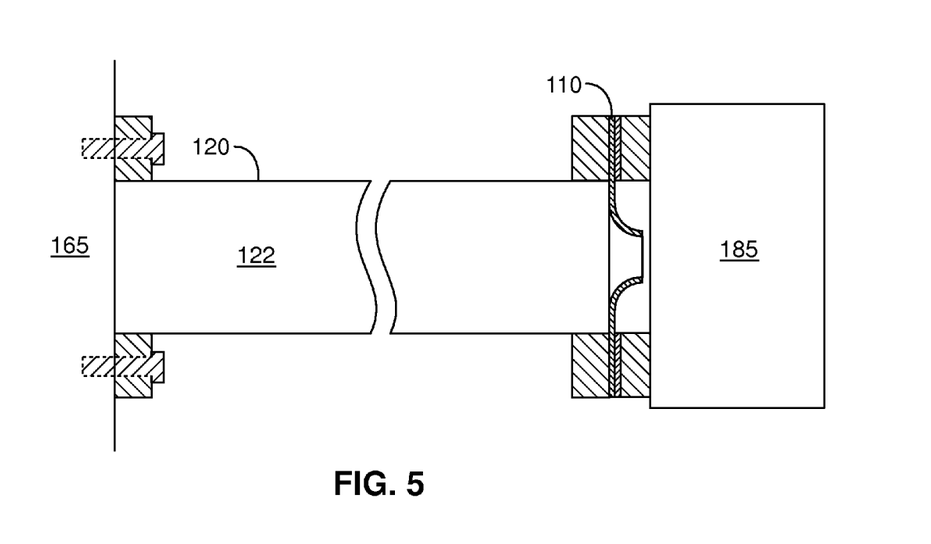
FIG. 5 is a cross-sectional view of another embodiment of an exhaust Venturi apparatus according to the present invention, with the Venturi mechanism mounted near the catalytic device.

The embodiments shown in FIGS. 3, 4, and 5 differ primarily on where the Venturi plate 110 is placed. There may be advantages of convenience and cost in certain of those embodiments, depending on the particular application, and the degree of mixing of exhaust with atmospheric gases may also be a factor in determining where to locate the plate 110.

FIG. 6 illustrates another embodiment of an exhaust Venturi apparatus 300 according to the invention, being the same view as shown in FIG. 2 (not showing the exhaust tube). The apparatus 300 includes a circular Venturi plate 310 and a mounting flange 315 of corresponding shape, the Venturi plate 310 and mounting flange 315 designed for abutting engagement as described above. Four mounting holes 325 are disposed in the mounting flange 315 for mounting to the engine head or other exhaust outlet, with corresponding holes (not shown) in the Venturi plate 310.

Eight holes 335 are disposed laterally through the mounting flange 315, which provide communication between the exhaust stream and the atmosphere. Unlike the slots 135, the holes 335 are disposed entirely through the mounting flange 315, rather than being converted from slots to holes through the engagement of the mounting flange 315 with the Venturi plate 310. The holes 335, however, like the slots 135, are small relative to the cross-sectional area of the exhaust passage, preventing significant acoustic energy from escaping the exhaust system while allowing for fluid communication of exhaust and atmospheric gases.

Like the Venturi plate 110, the Venturi plate 310 has a central hole 355 that is smaller in diameter than the central hole 340 disposed in the mounting flange 315, with a flare 360 similar in shape to the flare 160, providing a low-pressure zone just downstream of the Venturi plate 310 that draws in atmospheric air through the holes 335.

Figure 6A:
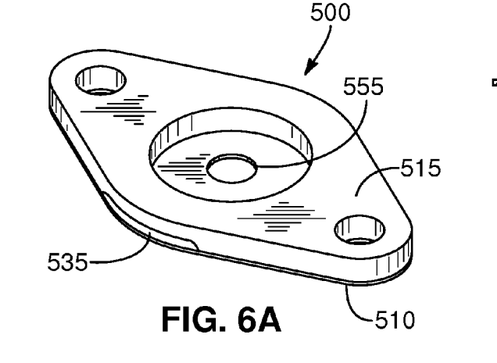
FIG. 6A is a perspective view of another embodiment of an exhaust Venturi according to the present invention.

FIG. 6A illustrates another embodiment of an exhaust Venturi apparatus 500 according to the invention, being the same view shown in FIG. 2 (not showing the exhaust tube). The apparatus 500 includes a Venturi plate 510 constructed identically to the Venturi plate 110, except that the Venturi plate 510 does not have a flare around its central hole 555, being flat throughout. A mounting flange 515 is placed in abutting engagement with the Venturi plate 510. The mounting flange 515 is of identical construction to the mounting flange 115, except that the mounting flange 515 does not contain a plurality of slots but rather a single slot 535 for communication between the exhaust stream and the atmosphere. The single slot 535 is of the same approximate height as the slots 135, but of greater width, to prevent significant acoustic energy from escaping the exhaust system while allowing for fluid communication of exhaust and atmospheric gases. Different cross-sectional shapes and sizes of the slot 535 are possible while remaining within the scope of the invention, depending on the particular needs of the system.

FIG. 7 shows the Venturi plate 110 in cross-sectional detail. The height of the flare 160 can be small (4 mm in one embodiment, as mentioned above) while still producing the desired Venturi effect.

Figure 7A:
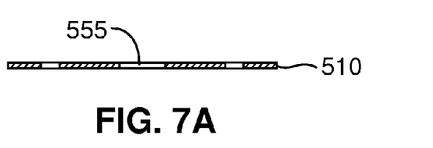
FIG. 7A is a cross-sectional view of the Venturi plate used in FIG. 6A.

FIG. 7A shows the Venturi plate 510 in cross-sectional detail. As mentioned above, the Venturi plate 510 contains no flare at all, being flat throughout, which may be desired in some applications. Eliminating the flare still creates the desired low-pressure zone, while generally causing an increase in back pressure.

Figure 8:
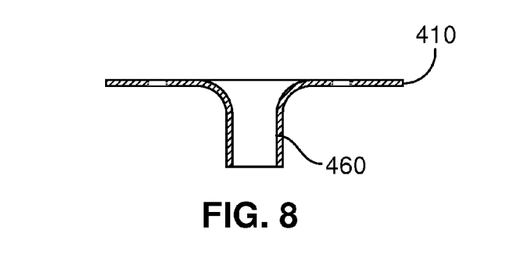
FIG. 8 is a cross-sectional view of another embodiment of a Venturi plate according to the present invention.

FIG. 8 shows another embodiment of the Venturi plate 410 which is similar in construction to the Venturi plate 110 except that the flare 460 is longer than the flare 160, which may be desired in some applications. Other modifications to the Venturi plate are possible and will be apparent to those skilled in the art in light of this disclosure.

If desired, a standard Venturi cone may be used in place of a Venturi plate. A Venturi cone is generally bulkier and more expensive than a plate, and may require an additional diverging cone, but may be desired by some practitioners of the invention in order to, for example, reduce possible backpressure in the engine block. One embodiment within the scope of the invention would be a Venturi cone or diverging cone pressed or shaped into the exhaust tube itself. The use of other Venturi mechanisms is also possible, or any other differential-pressure device or mechanism or housing section, i.e., a section of the exhaust tube or housing that changes the pressure in the housing and creates a low-pressure zone.

Figure 9:
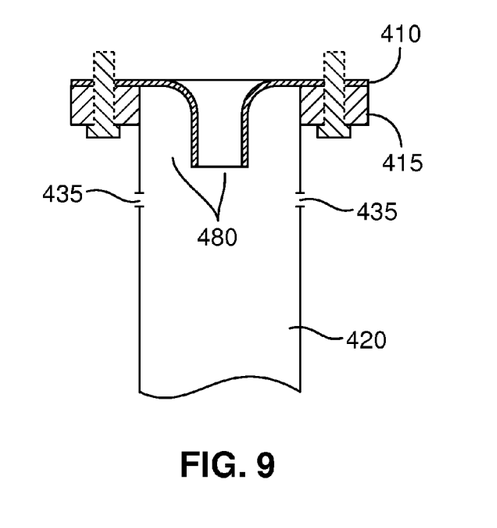
FIG. 9 is a cross-sectional view of another embodiment of an exhaust Venturi apparatus according to the present invention, using the Venturi plate of FIG. 8.

FIG. 9 shows the Venturi plate 410 in use with an exhaust tube 420 and mounting flange 415. The Venturi plate 410 creates a low-pressure zone generally in the area 480. Instead of atmospheric air being drawn into the exhaust stream through slots or holes in the mounting flange, however, the air is drawn through holes 435 disposed in the side of the exhaust tube 420 itself.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 10:
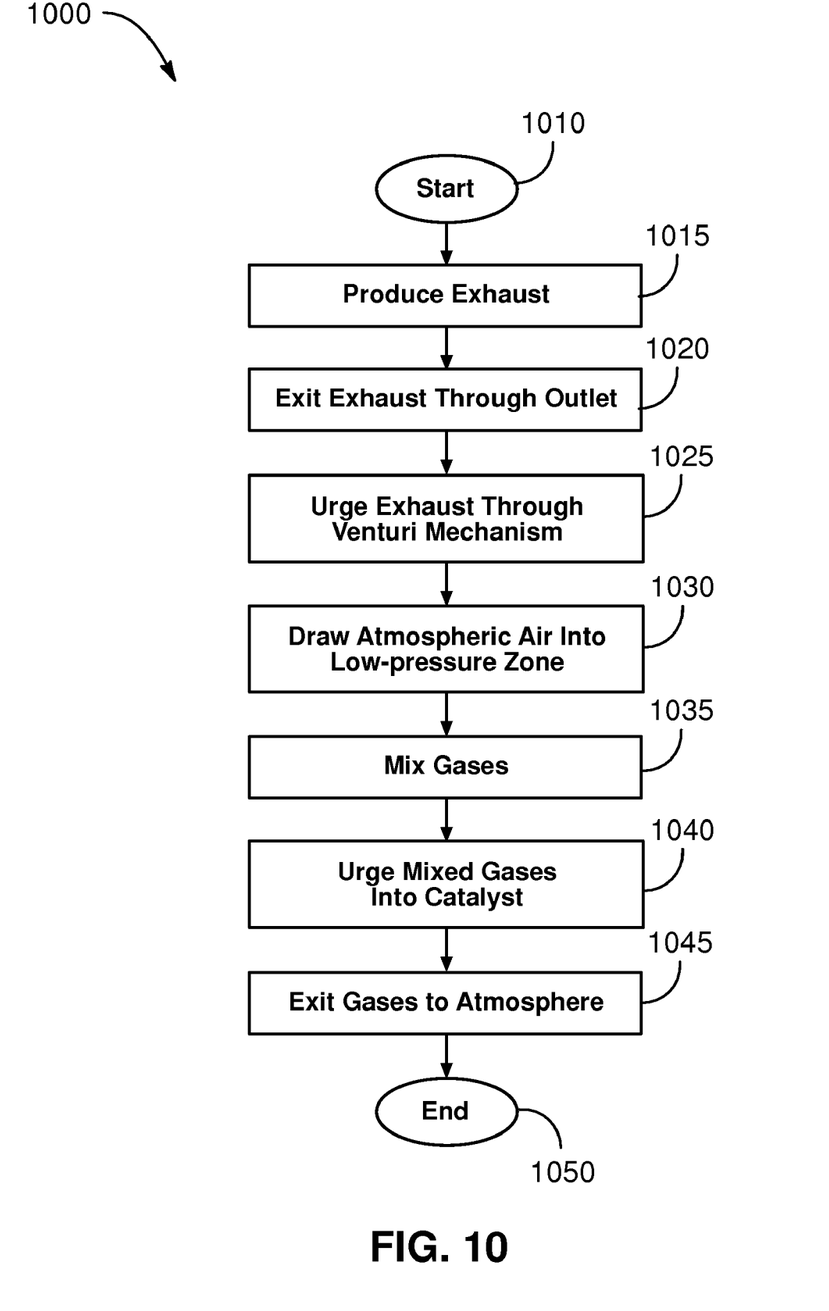
FIG. 10 is a flow chart illustrating a method of introducing secondary air into exhaust gases according to one embodiment of the present invention.

FIG. 10 is a schematic flow chart diagram illustrating one embodiment 1000 of a method of introducing secondary gas into an exhaust flow stream according to the invention. As shown, the method begins as shown in block 1010, and exhaust gas is produced in block 1015, such as by an engine. The exhaust exits the exhaust producer through an outlet in block 1020, such as the outlet 170 (FIG. 3). The exhaust is urged through a Venturi mechanism in block 1025, such as the Venturi plate 110, creating a low-pressure zone downstream of the Venturi mechanism. Atmospheric air is drawn into the exhaust stream in the low-pressure zone in block 1030, such as through slots 135. The atmospheric and exhaust gases are mixed in block 1035, such as in the exhaust passage 122, and the mixture is introduced in block 1040 into a device such as the catalytic converter 185, catalytic muffler, or other device. The catalyzed gases exit to the atmosphere in block 1045, and the method ends in block 1050.

Figure 11:
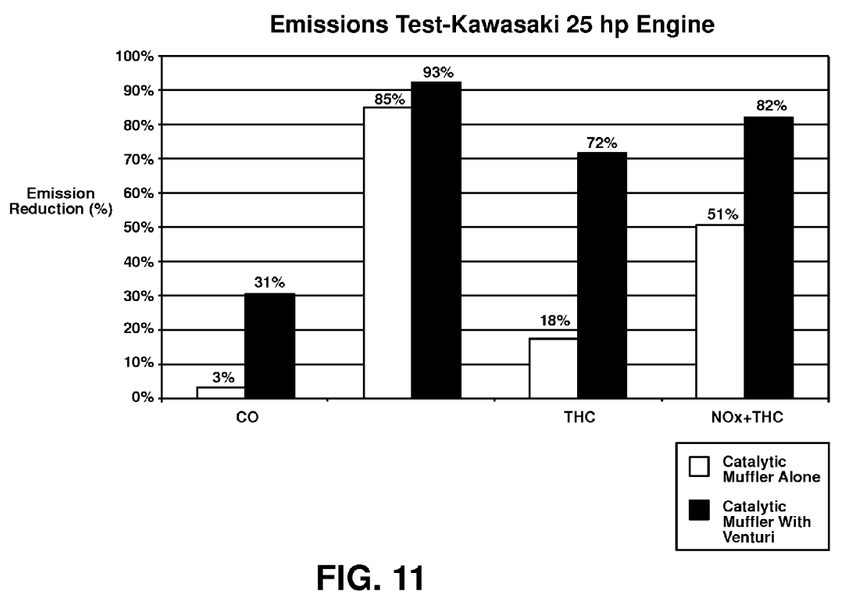
FIG. 11 is a chart illustrating the effect of one embodiment of the present invention on emission reduction.

FIG. 11 is a bar graph of emission tests conducted by the inventors of the present invention using a Kawasaki 25-horsepower engine. The graph shows the percentage of emission reduction (y axis) of various pollutants: CO, NOx, THC, and combined NOx and THC. The white bars show the percentage of emission reduction using a catalytic muffler alone, and the black bars show the percentage of emission reduction using the same engine and catalytic muffler together with an exhaust Venturi apparatus according to the present invention (specifically, the embodiment described in relation to FIGS. 1-3). It can be seen that the inventive apparatus increased emission reductions for each shown pollutant—a dramatic increase, in some cases.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for introducing secondary air into exhaust gases, the apparatus comprising:
    an elongate housing for passage of exhaust gases, the housing cross-sectional area being equal throughout the length of the housing;
    a flange secured to an inlet of the elongate housing, the flange comprising a central opening through which exhaust gases are flowable into the elongate housing, wherein the flange comprises a plurality of channels formed in an upstream surface of the flange, the plurality of channels each extending from an outer periphery of the flange to the central opening; and
    a Venturi plate disposed on the upstream surface of the flange, the Venturi plate comprising a central hole that is smaller than the central opening of the flange, wherein all exhaust gases flow through the central opening and into the elongate housing via the central hole of the Venturi plate, the Venturi plate configured to create a low-pressure zone in the exhaust gases that have passed through the central hole of the Venturi plate, wherein outlets of the plurality of channels open to the low-pressure zone, the low-pressure zone and outlets of the plurality of channels being external to the central hole;
    wherein the low-pressure zone causes secondary non-pressurized atmospheric air outside the housing to be drawn into exhaust gases within the low-pressure zone via the plurality of channels.

2. The apparatus of claim 1, wherein the Venturi plate is disposed on a first end of the housing.

3. The apparatus of claim 2, wherein the housing operatively attaches to an engine at the first end of the housing, the exhaust gases being produced by the engine.

4. The apparatus of claim 3, wherein the Venturi plate has outer and inner circumferences, and the flange having an outer circumference matching the outer circumference of the Venturi plate, and wherein the housing is mounted to the engine such that the Venturi plate is disposed between the flange and the engine.

5. The apparatus of claim 4, wherein the flange has an inner circumference defining the central opening, the central opening being coextensive with the exhaust gases passage defined by the housing, the central hole of the Venturi plate comprising a smaller passage for the exhaust gases than the passage comprised by the exhaust gases passage and the central opening.

6. The apparatus of claim 4, wherein the plurality of channels each comprise an open-sided slot on the flange, the Venturi plate configured to lie flat on the flange such that the Venturi plate closes the open sides of the plurality of slots.

7. The apparatus of claim 1, wherein the Venturi plate comprises a flat plate with an outer and an inner circumference, the inner circumference defining the central hole for passage of exhaust gases.

8. The apparatus of claim 1, wherein the Venturi plate comprises a cylindrical flare extending into and at least partially through the central opening of the flange in the first direction of the exhaust stream, the cylindrical flare defining the central hole of the Venturi plate.

9. The apparatus of claim 1, wherein a cross-sectional area of each of the plurality of channels is small compared to the cross-sectional area of the housing.

10. An apparatus for introducing secondary air into exhaust gases, the apparatus comprising:
   an elongate housing configured to contain exhaust gas flowing from a first end of the housing to a second end of the housing, the housing cross-sectional area being equal throughout the length of the housing;
   a flange secured to an inlet of the elongate housing, the flange comprising a central opening through which exhaust gases are flowable into the elongate housing, wherein the flange comprises a plurality of channels formed in an upstream surface of the flange, the plurality of channels each extending from an outer periphery of the flange to the central opening; and
   a Venturi plate comprising a cylindrical flare positioned on the upstream surface of the flange, the cylindrical flare defining a central opening having a smaller cross-sectional area than the cross-sectional area of the elongate housing, wherein all of the exhaust gas flowing into the elongate housing flows through the central opening, and wherein a low-pressure zone is defined between an outer surface of the cylindrical flare and an inner surface of the elongate housing, the low-pressure zone and outlets of the plurality of channels being upstream of an outlet of the central opening and external to the central opening; and
   wherein the low-pressure zone causes secondary non-pressurized atmospheric air outside the housing to be drawn into exhaust gases within the low-pressure zone via the plurality of channels, wherein the plurality of channels are positioned downstream of the Venturi plate.

11. The apparatus of claim 10, wherein the flare extends at least partially downstream from the plate.

12. The apparatus of claim 10, wherein the cylindrical flare comprises a flared collar.

13. The apparatus of claim 10, wherein the first end of the housing is mounted to an exhaust-producing engine, and wherein the Venturi plate is disposed at the first end of the housing.

14. The apparatus of claim 10, wherein each of the plurality of channels is small in cross-sectional area relative to the housing cross-sectional area.

15. An apparatus for introducing atmospheric air into an exhaust stream, the apparatus comprising:
   an elongate exhaust housing for the passage of exhaust gases, the housing having a first end, the first end attaching to an engine exhaust outlet, wherein the housing cross-sectional area is equal throughout the length of the housing;
   a flange secured to an inlet of the elongate housing, the flange comprising a central opening through which exhaust gases are flowable into the elongate housing, wherein the flange comprises a plurality of channels formed therein, the plurality of channels each extending from an outer periphery of the flange to the central opening;
   a Venturi mechanism disposed on an upstream surface of the flange, the Venturi mechanism comprising a converging cylindrical flare positioned within and concentric with the elongate exhaust housing, wherein the flare converges in an exhaust gas flow direction and defines a central opening with a maximum cross-sectional area that is smaller than a cross-sectional area of the elongate exhaust housing, the Venturi mechanism configured to create a low-pressure zone in the exhaust gases that have passed through an outlet of the converging cylindrical flare, wherein outlets of the plurality of channels are positioned external to the central opening of the cylindrical flare; and
   wherein the low-pressure zone causes secondary non-pressurized atmospheric air outside the housing to be drawn into exhaust gases within the low-pressure zone via the plurality of channels.

16. The apparatus of claim 15, wherein the Venturi mechanism comprises a Venturi plate.

17. The apparatus of claim 15, wherein the Venturi mechanism is disposed between the exhaust housing and the engine exhaust outlet.

18. An engine exhaust system operatively attached to an engine exhaust outlet, the system comprising:
   an elongate exhaust passage operatively attached at a first end to the exhaust outlet such that the exhaust flows into and through the exhaust passage, the exhaust passage having a cross-sectional area that is equal throughout the length of the exhaust passage;
   a mounting flange disposed on the exhaust passage first end, the mounting flange comprising a central opening;
   a Venturi plate of similar outer shape and size as the mounting flange disposed between the mounting flange and the engine, the Venturi plate comprising a cylindrical flare extending at least partially through the first central opening, the flare defining a central passage having a cross-sectional shape smaller than the central opening and elongate exhaust passage, wherein the Venturi plate forces all of the exhaust gas entering the elongate passage to pass through the flare, and wherein the Venturi plate is configured to create a low-pressure zone in exhaust gas after passing through the flare, the low-pressure zone being positioned between an outer surface of the flare and an inner surface of the flange that defines the central opening; and
   a plurality of slots formed in the mounting flange immediately downstream of the Venturi plate and upstream of an outlet of the flare, the slots being small in cross-section in comparison to the cross-sectional area of the exhaust passage, the slots comprising outlets that open to the low-pressure zone and that are positioned external to the central passage of the flare, which causes secondary non-pressurized atmospheric gas to be drawn into exhaust gas within the low-pressure zone.

19. The system of claim 18, wherein the Venturi plate comprises a flat plate configured to abut the flange and close an open side of the slots.

20. A method of introducing secondary air into exhaust gases contained within an elongate housing having a cross-sectional area that is equal throughout the length of the housing, the method comprising:
   urging the exhaust gases through the housing, forming an exhaust stream;

urging the exhaust stream through a central opening of a flange and a central hole of a Venturi plate concentric with and surrounded by the central opening of the flange, the central hole of the Venturi plate being smaller than the respective cross-sectional areas of the housing and central opening of the flange wherein the flange is coupled to an inlet of the housing;

creating a low-pressure zone within the exhaust stream after the exhaust stream passes through the central opening of the flange and the central hole of the Venturi plate, the low-pressure zone being upstream and external to the central hole of the Venturi plate; and drawing secondary non-pressurized atmospheric air outside the housing into the low-pressure zone through a plurality of small openings formed in the flange, the small openings being positioned upstream and external to the central hole of the Venturi plate.

21. The method of claim 20, wherein the secondary air is allowed to be drawn into the low-pressure zone immediately downstream of the Venturi plate.

* * * * *